(12) United States Patent
Liu et al.

(10) Patent No.: US 11,849,272 B2
(45) Date of Patent: Dec. 19, 2023

(54) NECKBAND HEADSET, START UP METHOD, SYSTEM, APPARATUS, AND COMPUTER MEDIUM

(71) Applicant: GOERTEK INC., Shandong (CN)

(72) Inventors: Xuyang Liu, Shandong (CN); Zengkai Yao, Shandong (CN); Kun Song, Shandong (CN); Yaxiong Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 196 days.

(21) Appl. No.: 17/624,015

(22) PCT Filed: Dec. 31, 2019

(86) PCT No.: PCT/CN2019/130299
§ 371 (c)(1),
(2) Date: Dec. 30, 2021

(87) PCT Pub. No.: WO2021/120328
PCT Pub. Date: Jun. 24, 2021

(65) Prior Publication Data
US 2022/0353600 A1 Nov. 3, 2022

(30) Foreign Application Priority Data
Dec. 20, 2019 (CN) .......................... 201911328440.9

(51) Int. Cl.
*H04R 1/10* (2006.01)
*H04R 5/02* (2006.01)

(52) U.S. Cl.
CPC ........... *H04R 1/1041* (2013.01); *H04R 1/105* (2013.01); *H04R 1/1016* (2013.01); *H04R 2460/03* (2013.01)

(58) Field of Classification Search
CPC .... H04R 1/1041; H04R 1/1016; H04R 1/105; H04R 2460/03
(Continued)

(56) References Cited

U.S. PATENT DOCUMENTS

| 2010/0166208 A1 | 7/2010 | Kato |
| 2019/0226875 A1 | 7/2019 | Li |

FOREIGN PATENT DOCUMENTS

| CN | 101771909 | 7/2010 |
| CN | 105554616 | 5/2016 |

(Continued)

OTHER PUBLICATIONS

International Search Report issued in PCT/CN2019/130299 dated Sep. 24, 2020.

*Primary Examiner* — Ammar T Hamid
(74) *Attorney, Agent, or Firm* — HAUPTMAN HAM, LLP

(57) ABSTRACT

A neckband headphone, a method, a system and a device for starting up a neckband headphone, as well as a computer readable storage medium are provided. The neckband headphone according to the present disclosure includes a neckband, a first earbud connected to an end of the neckband, a second earbud connected to another end of the neckband, a detector, and a processor connected to the detector. The detector is configured to acquire state information of the neckband headphone. The processor is configured to: determine whether the neckband headphone is worn based on the state information; control the neckband headphone to wake up when determining that the neckband headphone is worn, and control the neckband headphone to be in a low-power mode when determining that the neckband headphone is not worn.

8 Claims, 6 Drawing Sheets

(58) Field of Classification Search
USPC .................................................. 381/74, 301
See application file for complete search history.

(56) References Cited

FOREIGN PATENT DOCUMENTS

| | | | |
|---|---|---|---|
| CN | 106792308 | | 5/2017 |
| CN | 206272802 | | 6/2017 |
| CN | 206302535 | | 7/2017 |
| CN | 206302535 U | * | 7/2017 |
| CN | 207340113 | | 5/2018 |
| CN | 207369246 | | 5/2018 |
| CN | 207475791 | | 6/2018 |
| CN | 207475791 U | * | 6/2018 |
| CN | 108712697 | | 10/2018 |
| CN | 209199596 | | 8/2019 |
| CN | 110351646 | | 10/2019 |
| CN | 108141655 | | 2/2020 |
| WO | WO2016032011 | | 3/2016 |

* cited by examiner

NECKBAND HEADSET, START UP METHOD, SYSTEM, APPARATUS, AND COMPUTER MEDIUM

The present application is a 371 Application of International Patent Application No. PCT/CN2019/130299, titled "NECKBAND HEADSET, START-UP METHOD, SYSTEM, APPARATUS, AND COMPUTER MEDIUM", filed on Dec. 31, 2019, which claims the benefit of and priority to Chinese Patent Application No. 201911328440.9, titled "NECKBAND HEADSET, START-UP METHOD, SYSTEM, APPARATUS, AND COMPUTER MEDIUM", filed on Dec. 20, 2019 with the Chinese Patent Office, both of which are incorporated herein by reference in their entireties.

FIELD

The present disclosure relates to the technical field of headphones, and in particular to a neckband headphone, a method, a system and a device for starting up a neckband headphone, and a computer medium.

BACKGROUND

When using a neckband headphone, a user is required to start up or shut down the neckband headphone, which is time-consuming. As a result, the user has to wait for the neckband headphone to be started up and shut down. In addition, after using the neckband headphone, the user may forget to shut down the neckband headphone, resulting in unnecessary power consumption of the neckband headphone. Moreover, the neckband headphone may occupy a sound channel of user equipment, resulting in difficulties in the use of the user equipment.

In summary, how to improve user experience of starting up and shutting down a neckband headphone is a problem required to be solved urgently by those skilled in the art.

SUMMARY

A neckband headphone is provided according to the present disclosure, to improve user experience of starting up and shutting down the neckband headphone. A method for starting up a neckband headphone, a system for starting up a neckband headphone, a device for starting up a neckband headphone, and a computer readable storage medium are further provided according to the present disclosure.

In order to realize the above objective, the following technical solutions are provided according to the present disclosure.

A neckband headphone is provided according to the present disclosure. The neckband headphone includes a neckband, a first earbud connected to an end of the neckband, and a second earbud connected to another end of the neckband. The neckband headphone further includes a detector, and a processor connected to the detector. The detector is configured to acquire state information of the neckband headphone. The processor is configured to: determine whether the neckband headphone is worn based on the state information; control the neckband headphone to wake up when determining that the neckband headphone is worn, and control the neckband headphone to be in a low-power mode when determining that the neckband headphone is not worn.

Preferably, the detector includes a first wearing detection sensor configured to detect whether the first earbud is separated from the second earbud. The first wearing detection sensor includes a first magnet arranged on the first earbud, a second magnet arranged on the second earbud, and a Hall element arranged on the first earbud or the second earbud.

Preferably, the detector further includes a second wearing detection sensor configured to detect whether the neckband headphone is hung on a human neck. The second wearing detection sensor includes an infrared sensor arranged on the neckband headphone.

Preferably, the neckband of the neckband headphone is provided with a sensor protective glass on a side facing the human neck. The infrared sensor is arranged between the neckband and the sensor protective glass.

Preferably, the state information includes: a first distance between the first earbud and the second earbud and a second distance between the neckband and the human neck. The first earbud detected is by the first wearing detection sensor. The second distance is detected by the second wearing detection sensor.

Preferably, the processor is configured to: determine whether the first distance is less than a first distance threshold stored in the processor; determine that the first earbud is stuck to the second earbud when determining that the first distance is less than the first distance threshold; and determine that the first earbud is separated from the second earbud when determining that the first distance is not less than the first distance threshold.

Preferably, the processor is configured to: determine whether the second distance is less than a second distance threshold stored in the processor; determine that the neckband is hung on the human neck when determining that the second distance is less than the second distance threshold; and determine that the neckband is not hung on the human neck when determining that the second distance is not less than the second distance threshold.

Preferably, for determining whether the neckband headphone is worn based on the state information, the processor is configured to: determine whether the first distance is less than a first distance threshold stored in the processor; determine that the neckband headphone is not worn when determining that the first distance is less than the first distance threshold; determine whether the second distance is less than a second distance threshold stored in the processor when determining that the first distance is not less than the first distance threshold; determine that the neckband headphone is worn when determining that the second distance is less than the second distance threshold; and determine that the neckband headphone is not worn when determining that the second distance is not less than the second distance threshold.

Preferably, for determining whether the neckband headphone is worn based on the state information, the processor is configured to: determine whether the second distance is less than a second distance threshold stored in the processor; determine that the neckband headphone is not worn when determining that the second distance is not less than the second distance threshold; determine whether the first distance is less than a first distance threshold stored in the processor when determining that the second distance is less than the second distance threshold; determine that the neckband headphone is not worn when determining that the first distance is less than the first distance threshold; and determine that the neckband headphone is worn when determining that the first distance is not less than the first distance threshold.

Preferably, in the low-power mode, only the detector and the processor of the neckband headphone are enabled.

A method for starting up a neckband headphone is provided. The method is applied to the neckband headphone. The method includes: determining whether the neckband headphone is worn; controlling the neckband headphone to wake up when determining that the neckband headphone is worn; and controlling the neckband headphone to be in a low-power mode when determining that the neckband headphone is not worn.

Preferably, waking up of the neckband headphone includes that the neckband headphone is on standby and that the neckband headphone is fully on. The controlling the neckband headphone to wake up includes: controlling the neckband headphone to be on standby; determining whether a condition for the neckband headphone being fully on is met; and controlling the neckband headphone to be fully on when it is determined that the condition is met. A sensor of the neckband headphone is on standby when the neckband headphone is on standby, and all components of the neckband headphone operate when the neckband headphone is fully on.

Preferably, the determining whether a condition for the neckband headphone being fully on is met includes: determining whether a function instruction is received; determining that the condition for the neckband headphone being fully on is met when it is determined that a function instruction is received; and determining that the condition for the neckband headphone being fully on is not met when it is determined that no function instruction is received.

A system for starting up a neckband headphone is provided. The system is applied to the neckband headphone. The system includes a first determination module, a first control module, and a second control module. The first determination module is configured to determine whether the neckband headphone is worn. The first control module is configured to control the neckband headphone wake up state in a case that the neckband headphone is worn. The second control module is configured to control the neckband headphone to be in a low-power mode in a case that the neckband headphone is not worn.

A device for starting up a neckband headphone is provided. The device is applied to the neckband headphone. The device includes a memory and a processor. The memory is configured to store a computer program. The processor is configured to execute the computer program to perform the method for starting up a neckband headphone described above.

A computer readable storage medium applied to a neckband headphone is provided. The computer readable storage medium stores a computer program that, when being executed by a processor, performs the method for starting up a neckband headphone described above.

The neckband headphone according to the present disclosure includes a neckband, a first earbud connected to an end of the neckband, a second earbud connected to another end of the neckband, a detector, and a processor connected to the detector. The detector is configured to acquire state information of the neckband headphone. The processor is configured to: determine whether the neckband headphone is worn based on the state information; control the neckband headphone to wake up when determining that the neckband headphone is worn, and control the neckband headphone to be in a low-power mode when determining that the neckband headphone is not worn. According to the neckband headphone according to the present disclosure, the detector acquires the state information of the neckband headphone. The processor determines whether the neckband headphone is worn based on the state information acquired by the detector, and controls the neckband headphone to be in the low-power mode or to wake up based on a determination result, so that the neckband headphone automatically switches between on and off. Therefore, it is unnecessary for the user to start up or shut down the neckband headphone, thereby improving the user experience of starting up and shutting down the neckband headphone. The method for starting up a neckband headphone, the system for starting up a neckband headphone, the device for starting up a neckband headphone, and the computer readable storage medium according to the present disclosure also solve the technical problems.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below are merely part of drawings of the present disclosure, and those skilled in the art may obtain other drawings according to the provided drawings without any creative effort.

DETAILED DESCRIPTION OF EMBODIMENTS

Technical solutions of embodiments of the present disclosure are described below in conjunction with the drawings of the embodiments of the present disclosure. Apparently, the embodiments described below are only some rather than all of the embodiments of the present disclosure. Any other embodiments obtained by those skilled in the art based on the embodiments in the present disclosure without any creative effort fall within the protection scope of the present disclosure.

Figure 1:
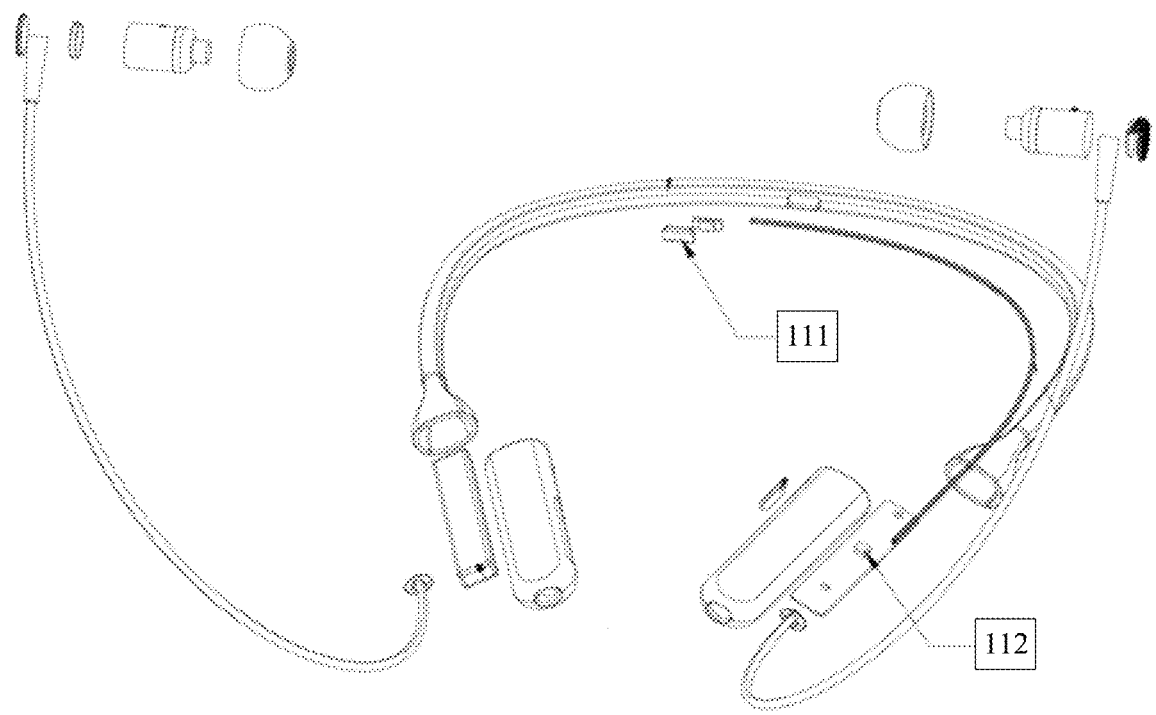
FIG. 1 is a structural schematic diagram of a neckband headphone according to an embodiment of the present disclosure.

Referring to FIG. 1, which is a structural schematic diagram of a neckband headphone according to an embodiment of the present disclosure.

The neckband headphone according to the embodiment of the present disclosure includes a detector 111, and a processor 112 connected to the detector 111.

The detector 111 is configured to acquire state information of the neckband headphone.

The processor 112 is configured to determine whether the neckband headphone is worn based on the state information, control the neckband headphone to wake up when determining that the neckband headphone is worn, and control the neckband headphone to be in a low-power mode when determining that the neckband headphone is not worn.

In practical application, positions where the detector and processor are arranged in the neckband headphone depend on actual needs, and a type of the detector may also depend on the actual needs. In the embodiment of the present disclosure, the neckband headphone being in the low-power mode replaces the neckband headphone being shut down and the neckband headphone being woken up replaces the neckband headphone being starting up, so that the neckband headphone automatically switches between on and off without an operation performed by the user. Therefore, it is unnecessary for the user to wait for the neckband headphone to be started up or shut down, thereby improving the user experience of starting up and shutting down the neckband headphone. It should be noted that since the detector is required to provide the state information to the processor and the processor is required to perform determination based on the state information, the detector and the processor both are in a low-power mode when the neckband headphone is in the low-power mode. In addition, the neckband headphone according to the present disclosure further includes the same component as the existing headphone, such as a neckband, a first earbud and a second earbud that are connected to two ends of the neckband respectively.

The neckband headphone according to the present disclosure includes a detector, and a processor connected to the detector. The detector is configured to acquire state information of the neckband headphone. The processor is configured to determine whether the neckband headphone is worn based on the state information, control the neckband headphone to wake up when determining that the neckband headphone is worn, and control the neckband headphone to be in a low-power mode when determining that the neckband headphone is not worn. In the neckband headphone according to the present disclosure, the detector acquires the state information of the neckband headphone. The processor determines whether the neckband headphone is worn based on the state information acquired by the detector, and controls the neckband headphone to wake up or to be in a low-power mode based on a determination result, so that the neckband headphone switches between on and off without operation by the user, thereby automatically starting up and shutting down the neckband headphone, and improving the user experience of starting up and shutting down the neckband headphone.

In the application of the neckband headphone, when the neckband headphone is worn, the first earbud of the neckband headphone is separated from the second earbud of the neckband headphone, and the neckband is hung on the neck of the user. Therefore, whether the neckband headphone is worn may be determined by determining whether the first earbud is separated from the second earbud and determining whether the neckband is hung on the neck of the user. That is, the detector in the neckband headphone according to the present disclosure includes a first wearing detection sensor configured to detect whether the first earbud is separated from the second earbud, and a second wearing detection sensor configured to detect whether the neckband headphone is hung on the user. Further, the first wearing detection sensor and the second wearing detection sensor may perform determination based on distance information.

Figure 2:
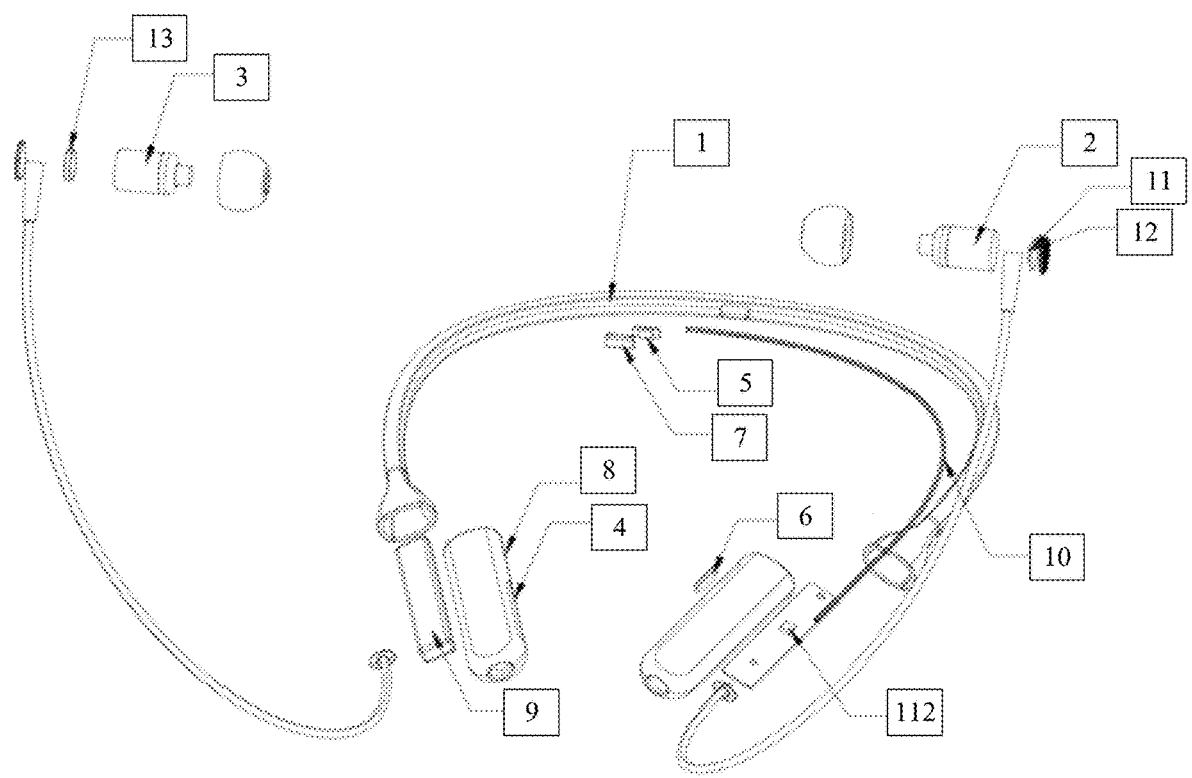
FIG. 2 is a structural schematic diagram of a neckband headphone according to an embodiment of the present disclosure.

Reference is made to FIG. 2, which is a structural schematic diagram of a neckband headphone according to an embodiment of the present disclosure. In FIG. 2, a Hall element is arranged on the second earbud.

In the neckband headphone according to the embodiment of the present disclosure, the first wearing detection sensor may be a component added to the neckband headphone. For example, when the neckband headphone is worn, a left earbud of the neckband headphone is separated from a right earbud of the neckband headphone. That is, there is a distance between the left earbud and the right earbud. In addition, the neckband headphone is hung on the user. Therefore, based on the state information when the neckband headphone is worn, the first wearing detection sensor 111 includes a first magnet 13 arranged on a first earbud 3, a second magnet 12 arranged on a second earbud 2, and a Hall element 11 arranged on the first earbud 3 or the second earbud 2. The second wearing detection sensor includes a distance sensor 5 arranged on the neckband headphone, for example, an infrared sensor.

The Hall element 11 is configured to generate, based on attraction between the first magnet 13 and the second magnet 12, a first distance characterizing whether the first earbud is separated from the second earbud. The Hall element operates as follows. When the neckband headphone is worn, the Hall element is only affected by a magnetic field of a single magnet with a magnetic field state A (including intensity and a direction) (where there is almost no external magnetic field). When the neckband headphone is not worn, the magnet on the first earbud and the magnet on the second earbud are stuck to each other. In this case, the Hall element is affected by a magnetic field of magnets stuck to each other, with a magnetic field state B (including intensity and a direction). The first distance characterizing whether the first earbud is separated from the second earbud is generated based on states A and B.

The distance sensor 5 is configured to generate a second distance characterizing the distance between the neckband of the neckband headphone and the neck of the user. The infrared sensor emits infrared light, and determines the distance between a wireless headphone and the neck of the user based on intensity of infrared light reflected by an obstacle.

In practical application, in order to determine whether the first earbud is separated from the second earbud, the processor 112 determines whether the first distance is less than a first distance threshold written in the processor in advance. If the first distance is less than the first distance threshold, the processor 112 determines that the first earbud is stuck to the second earbud. If the first distance is not less than the first distance threshold, the processor 112 determines that the first earbud is separated from the second earbud. Accordingly, in order to determine whether the neckband is hung on the neck of the user, the processor 112 determines whether the second distance is less than a second distance threshold written in the processor in advance. If the second distance is less than the second distance threshold, the processor 112 determines that the neckband is hung on the neck of the user. If the second distance is not less than the second distance threshold, the processor 112 determines that the neckband is not hung on the neck of the user.

In an application scenario, for determining whether the neckband headphone is worn based on the state information, the processor 112 is configured to: determine whether the first distance is less than the first distance threshold written in the processor in advance; determine that the neckband headphone is not worn if the first distance is less than the first distance threshold; determine whether the second distance is less than the second distance threshold written in the processor in advance if the first distance is not less than the first distance threshold; determine that the neckband headphone is worn if the second distance is less than the second distance threshold; and determine that the neckband headphone is not worn if the second distance is not less than the second distance threshold.

Alternatively, for determining whether the neckband headphone is worn based on the state information, the processor 112 is configured to: determine whether the second distance is less than the second distance threshold written in the processor in advance; determine that the neckband headphone is not worn if the second distance is not less than the second distance threshold; determine whether the first distance is less than the first distance threshold written in the processor in advance if the second distance is less than the second distance threshold; determine that the neckband headphone is not worn if the first distance is less than the first distance threshold; and determine that the neckband headphone is worn if the first distance is not less than the first distance threshold.

It should be noted that each of the first earbud and the second earbud is provided with a magnet, so that the left earbud is stuck to the right earbud when neckband headphone is not worn. In this case, the Hall element detects information, and the processor determines that the earbud is stuck to the right earbud based on the information detected by the Hall element and then determines that the neckband headphone is not worn. When the left earbud is separated from the right earbud, the Hall element acquires no information. In this case, the processor determines that the left earbud is separated from the right earbud based on a detection result of the Hall element. In this process, since the distance sensor is configured to generate the second distance characterizing the distance between the neckband of the neckband headphone and the neck of the user, the distance sensor is required to be arranged at a position so that the distance sensor can sense the neck of the user. For example, the distance sensor is arranged on an inner wall of the neckband headphone. In this case, the distance sensor detects a distance relative to the neck of the user. When the distance sensor acquires information, the processor determines that the neckband headphone is hung on the user. When the neckband headphone is worn, the neckband headphone is hung on the user and the first earbud is separated from the second earbud. Therefore, the processor determines, in a case that both of the distance sensor and the Hall element acquire information, that the neckband headphone is not worn; and determines, in a case that the distance sensor acquires information and the Hall element acquires no information, that the neckband headphone is worn. For ease of understanding, it is assumed that a signal of 1 transmitted by the Hall element indicates that the first earbud is separated from the second earbud, and a signal of 0 transmitted by the Hall element indicates that the first earbud is stuck to the second earbud, a signal of 1 transmitted by the distance sensor indicates that the neckband headphone is hung on the user, and a signal of 0 transmitted by the distance sensor indicates that the neckband headphone is not hung on the user. Therefore, the processor determines, only when receiving both the signal of 1 transmitted by the Hall element and the signal of 1 transmitted by the distance sensor, that the neckband headphone is worn. In other cases, the processor determines that the neckband headphone is not worn.

For ease of understanding, an operation process of the neckband headphone according to the present disclosure is described in combination with an application scenario. When the first wearing detection sensor acquires the information indicating that the first earbud is separated from the second earbud and the second wearing detection sensor acquires the information indicating that the neckband is hung on the neck of the user, the processor determines that the neckband headphone is worn and controls the neckband headphone to wake up. When the first wearing detection sensor acquires information indicating that the first earbud is separated from the second earbud and the second wearing detection sensor acquires information indicating that the neckband is not hung on the neck of the user, the processor determines that the neckband headphone is not worn and controls the neckband headphone to be in the low-power mode. In this case, the user may separate the first earbud from the second earbud, but does not wear the neckband headphone. When the first wearing detection sensor acquires information indicating that the first earbud is stuck to the second earbud and the second wearing detection sensor acquires information indicating that the neckband is hung on the neck of the user, the processor determines that the neckband headphone is worn and controls the neckband headphone to be in the low-power mode. In this case, the neckband may hang on the neck of the user, and the first earbud and the second earbud are not inserted into ears. When the first wearing detection sensor acquires information indicating that the first earbud is stuck to the second earbud and the second wearing detection sensor acquires information indicating that the neckband is not hung on the neck of the user, the processor determines that the neckband headphone is not worn and controls the neckband headphone to be in the low-power mode. In this case, the user performs no operation on the neckband headphone. In the neckband headphone according to the embodiment of the present disclosure, in order to fix the magnets, the first magnet is fixed on the first earbud with glue or an earplug mainboard, and the second magnet is fixed on the second earbud with glue or an earplug mainboard.

Referring to FIG. 2, in the neckband headphone according to the embodiment of the present disclosure, in order to arrange the infrared sensor, the infrared sensor is pasted on a sensor protective glass 7 by a mainboard. The sensor protective glass 7 is fixed on the neckband 1 of the neckband headphone with instant glue. The infrared sensor is connected to the processor via an IR sensor connection cable 10.

Figure 3:
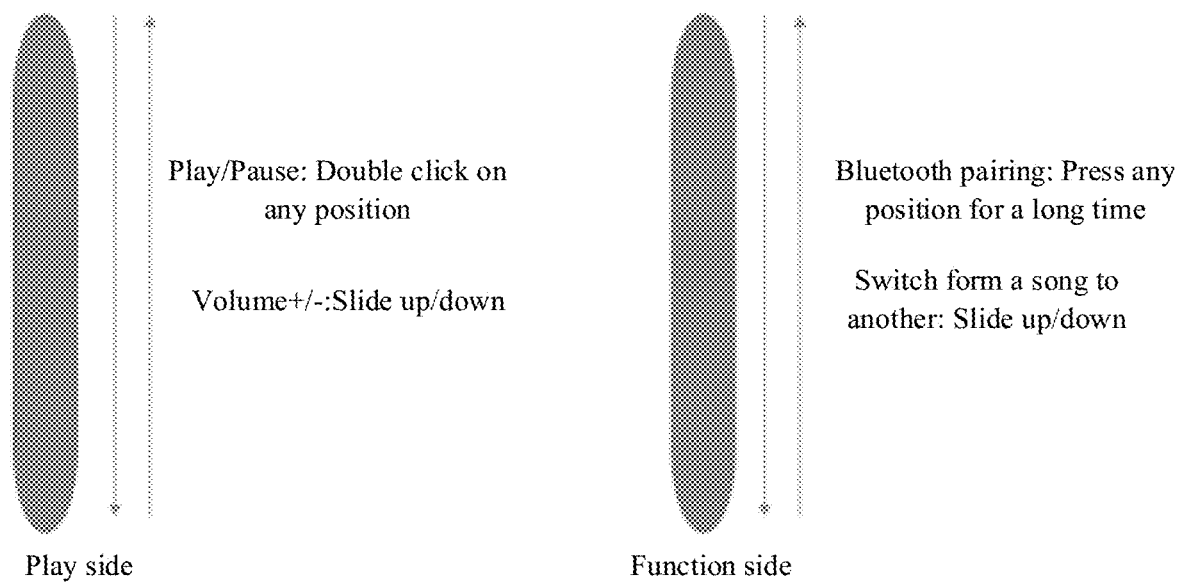
FIG. 3 is a schematic diagram showing hand movements applicable to a touchpad.

Referring to FIG. 2, in the neckband headphone according to the embodiment of the present disclosure, in order to reduce the number of openings on the neckband headphone and improve waterproof and dustproof performance of the neckband headphone, a touchpad 4 is arranged on the neckband headphone. A touch button on the touchpad serves as a button of the neckband headphone. That is, in the present disclosure, a virtual button on the touchpad replaces a physical button on the conventional neckband headphone. A touchpad is arranged on each of a left part and a right part of the neckband of the neckband headphone. The two touchpads are configured to serve as a play side and a function side, respectively. FIG. 3 shows hand movements respectively applicable to the two touchpads. At the play side, playing and pausing are implemented by double clicking on any position, increasing a volume is implemented by sliding up on the touchpad, and decreasing a volume is implemented by sliding down on the touchpad. At the function side, Bluetooth pairing is implemented pressing any position for a long time, and switching from a song to another is implemented by sliding up or sliding down on the touchpad.

In practical application, a USB interface 6 of the neckband headphone is arranged on one of the two touchpads, and an MIC 8 of the neckband headphone is arranged on the other of the two touchpads. It should be noted that for description of a component in the neckband headphone according to the present disclosure commonly included in the existing neckband headphone, such as a battery, one may refer to the conventional technology and therefore the component is not described in detail herein.

Figure 4:
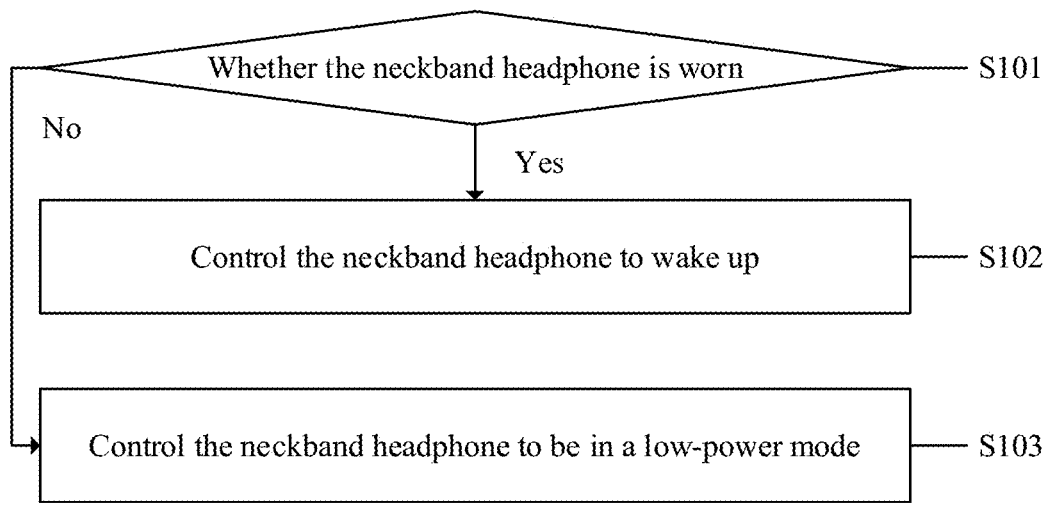
FIG. 4 is a flowchart of a method for starting up a neckband headphone according to an embodiment of the present disclosure.

Reference is made to FIG. 4, which is a flowchart of a method for starting up a neckband headphone according to an embodiment of the present disclosure.

The method for starting up a neckband headphone according to an embodiment of the present disclosure is applied to a neckband headphone, and the method includes the following steps S101 to S103.

In step S101, it is determined whether the neckband headphone is worn, the method proceeds to step S102 in a case that the neckband headphone is worn, and the method proceeds to step S103 in a case that the neckband headphone is not worn. In step S102, the neckband headphone is controlled to wake up. In step S103, the neckband headphone is controlled to be in a low-power mode.

In the method for starting up a neckband headphone according to an embodiment of the present disclosure, the neckband headphone determines whether the neckband headphone is worn, and controls the neckband headphone to wake up or be in a low-power mode based on a determination result, thereby automatically switching between operation states. It should be noted that in the present disclosure, controlling the neckband headphone to wake up simulates starting up the conventional neckband headphone, and controlling the neckband headphone to be in the low-power mode simulates shutting down the conventional neckband headphone. In this way, the neckband headphone is automatically started up and shut down. Therefore, it is unnecessary for the user to wait for the neckband headphone to be started up or shut down, thereby improving the user experience of starting up and shutting down the neckband headphone.

In the method for starting up a neckband headphone according to an embodiment of the present disclosure, the left earbud of the neckband headphone is separated from the right earbud of the neckband headphone when the user wears the neckband headphone. That is, there is a distance between the left earbud and the right earbud, and the neckband headphone is close to the user. Therefore, whether the neckband headphone is worn is determined by determining whether the distance between the neckband headphone and the user is less than a first predetermined distance. It is determined whether the distance between the left earbud and the right earbud of the neckband headphone is greater than a second predetermined distance in a case that the distance between the neckband headphone and the user is less than the first predetermined distance. It is determined that the neckband headphone is worn in a case that the distance between the left earbud and the right earbud of the neckband headphone is greater than the second predetermined distance. It is determined that the neckband headphone is not worn in a case that the distance between the left earbud and the right earbud of the neckband headphone is less than or equal to the second predetermined distance. It is determined that the neckband headphone is not worn in a case that the distance between the neckband headphone and the user is greater than or equal to the first predetermined distance. It should be noted that a component such as a Hall element and a distance sensor in the above embodiments is arranged on the neckband headphone so as to determine the distances. That is, a structure of the neckband headphone is improved, and the improvement depends on actual needs.

In a method for starting up a neckband headphone according to an embodiment of the present disclosure, the processing flow of the neckband headphone is improved without changing the structure of the conventional neckband headphone, so that whether the neckband headphone is worn is automatically determined. For example, whether the neckband headphone is worn is determined by determining whether a sound instruction characterizing that the neckband headphone is worn is received by a microphone of the neckband headphone. It is determined that the neckband headphone is worn if a sound instruction characterizing that the neckband headphone is worn is received. It is determined whether a sound instruction characterizing that the neckband headphone is not worn is received by the microphone. It is determined that the neckband headphone is not worn if the sound instruction characterizing that the neckband headphone is not worn is received. That is, whether the neckband headphone is worn is determined based on sound. In this case, when the neckband headphone is in a low-power mode, the microphone of the neckband headphone is on standby.

In practical application, whether the neckband headphone is worn is also determined by determining whether a touch instruction indicating that the neckband headphone is worn is received via a touchpad of the neckband headphone. It is determined that the neckband headphone is worn if the touch instruction characterizing that the neckband headphone is worn is received. It is determined whether a touch instruction characterizing that the neckband headphone is not worn is received via the touchpad. It is determined that the neckband headphone is not worn if the touch instruction characterizing that the neckband headphone is not worn is received. That is, whether the neckband headphone is worn is determined based on touch. In this case, when the neckband headphone is in the low-power mode, the microphone of the neckband headphone is on standby.

In practical application, in order to reduce power consumption of the neckband headphone as much as possible when the neckband headphone operates, it is determined whether a period of time during which the neckband headphone acquires no Bluetooth data is greater than a predetermined period of time. The neckband headphone is automatically switched to the low-power mode if the period of time during which the neckband headphone acquires no Bluetooth data is greater than the predetermined period of time.

Figure 5:
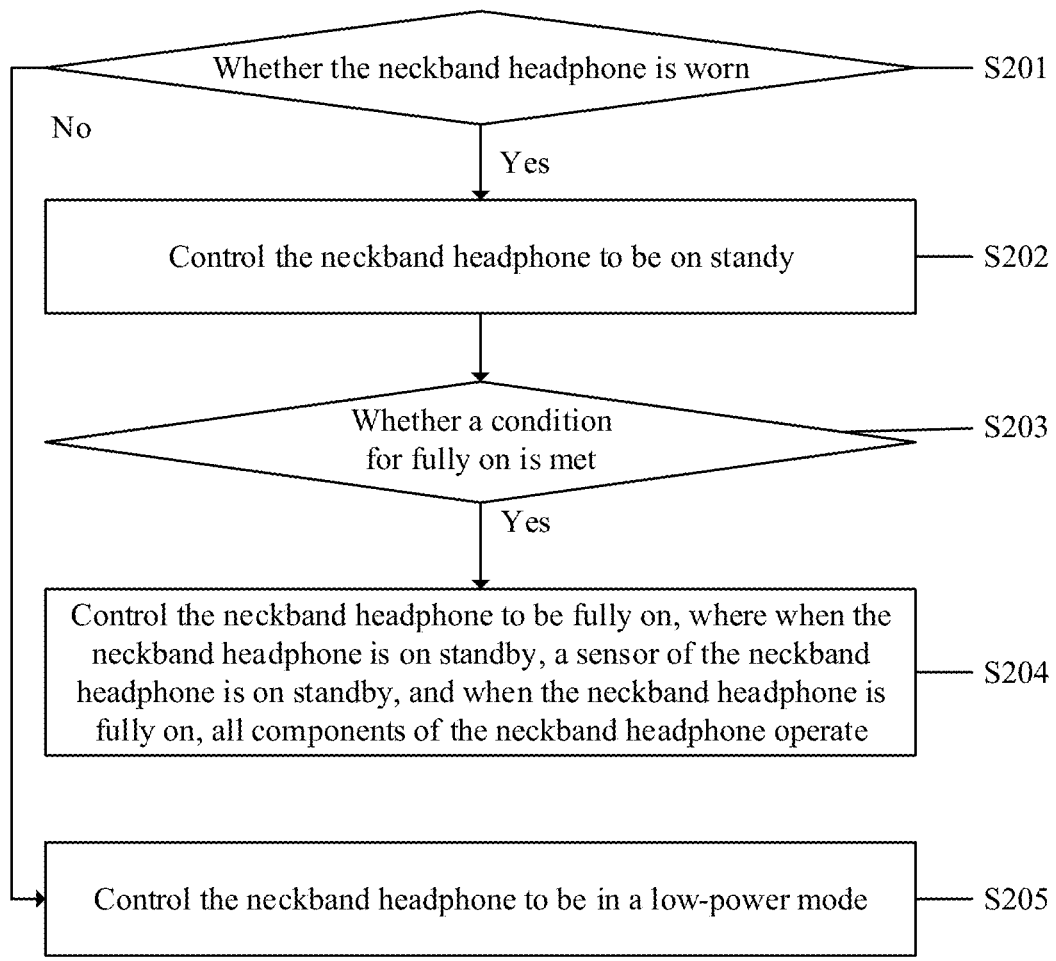
FIG. 5 is a flowchart of a method for starting up a neckband headphone according to an embodiment of the present disclosure.

Reference is made to FIG. 5, which is a flowchart of a method for starting up a neckband headphone according to an embodiment of the present disclosure.

The method for starting up a neckband headphone according to the embodiment of the present disclosure is applied to a neckband headphone, and the method includes the following steps S201 to S205.

In step S201, it is determined whether the neckband headphone is worn. The method proceeds to step S202 in a case that the neckband headphone is worn. The method proceeds to step S203 in a case that the neckband headphone is not worn.

In step S202, the neckband headphone is controlled to be on standby, and the method proceeds to step S203.

In step S203, it is determined whether a condition for the neckband headphone being fully on is met, and the method proceeds to step S204 if the condition is met.

In step S204, the neckband headphone is controlled to be fully on. When the neckband headphone is on standby, a sensor of the neckband headphone is on standby. When the neckband headphone is fully on, all components of the neckband headphone operate.

In the method for starting up a neckband headphone according to the embodiment of the present disclosure, in order to further reduce power consumption of the neckband headphone, the neckband headphone is on standby or fully on. The neckband headphone is on standby instead of operates, and it is determined whether the condition for the neckband headphone being fully on is met. The neckband headphone is controlled to be fully on in a case that the condition is met. When the neckband headphone is on standby, a sensor of the neckband headphone such as a touchpad, a barometer, or a gravity sensor is on standby. When the neckband headphone is fully on, all components of the neckband headphone operate.

In step S205, the neckband headphone is controlled to be in a low-power mode.

In practical application, the neckband headphone being on standby is different from the neckband headphone being fully on in that: whether the neckband headphone is required to perform a function. Therefore, is it determined whether a function instruction is received so as to determine whether the condition for the neckband headphone being fully on is met. It is determined that the condition for the neckband headphone being fully on is met when the function instruction is received, and it is determined that the condition for the neckband headphone being fully on is not met when no function instruction is received.

Figure 6:
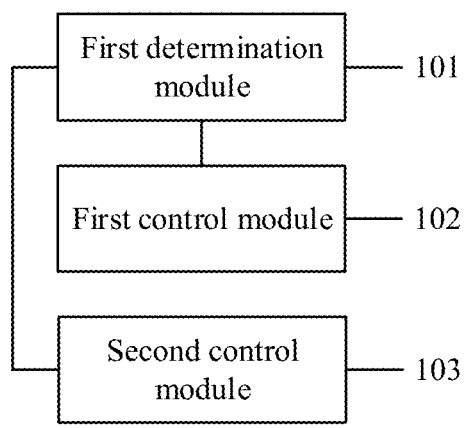
FIG. 6 is a structural schematic diagram of a system for starting up a neckband headphone according to an embodiment of the present disclosure.

Reference is made to FIG. 6, which is a structural schematic diagram of a system for starting up a neckband headphone according to an embodiment of the present disclosure.

The system for starting up a neckband headphone according to the embodiment of the present disclosure is applied to a neckband headphone, and the system includes a first determination module 101, a first control module 102 and a second control module 103.

The first determination module 101 is configured to determine whether the neckband headphone is worn.

The first control module 102 is configured to control the neckband headphone to wake up in a case that the neckband headphone is worn.

The second control module 103 is configured to control the neckband headphone to be in a low-power mode in a case that the neckband headphone is not worn.

For the description of modules in the system for starting up a neckband headphone according to the embodiment of the present disclosure, one may refer to the above embodiments and therefore these modules are not described in detail herein.

Figure 7:
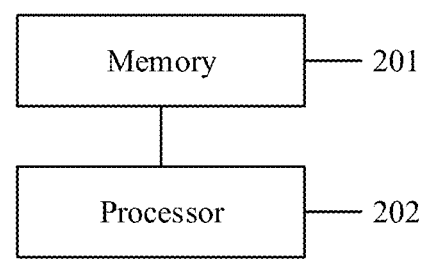
FIG. 7 is a structural schematic diagram of a device for starting up a neckband headphone according to an embodiment of the present disclosure.

A device for starting up a neckband headphone and a computer readable storage medium are further provided according to the embodiments of the present disclosure. The device and the computer readable storage medium have the same effects as the method for starting up a neckband headphone. Reference is made to FIG. 7, which is a structural schematic diagram of a device for starting up a neckband headphone according to an embodiment of the present disclosure.

The device for starting up a neckband headphone according to the embodiment of the present disclosure includes a memory 201 and a processor 202. The memory 201 is configured to store a computer program. The processor 202 is configured to execute the computer program to perform the method for starting up a neckband headphone according to any one of the above embodiments.

Figure 8:
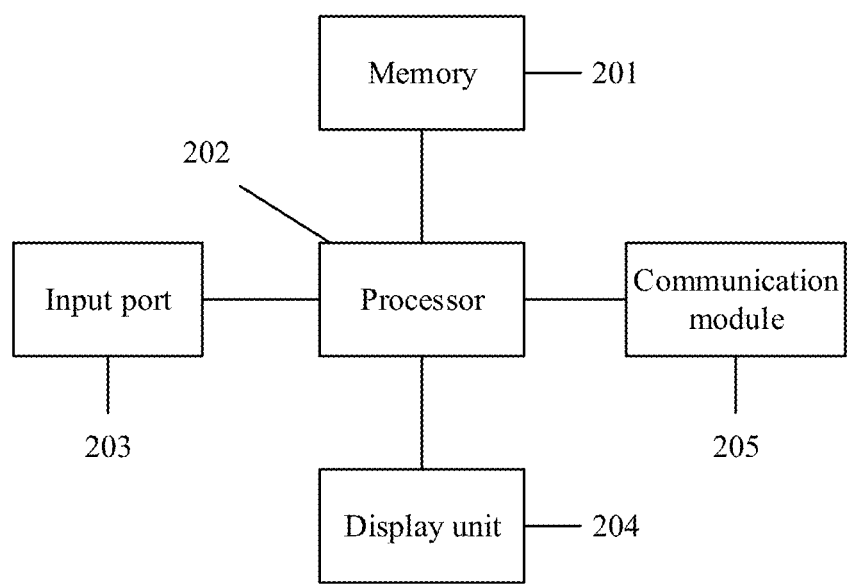
FIG. 8 is a structural schematic diagram of a device for starting up a neckband headphone according to another embodiment of the present disclosure.

Referring to FIG. 8, the device for starting up a neckband headphone according to another embodiment of the present disclosure further includes an input port 203, a display unit 204 and a communication module 205. The input port 203, the display unit 204 and the communication module 205 are connected to the processor 202. The input port 203 is configured to transmit to the processor 202 a command inputted from the outside. The display unit 204 is configured to display a processing result of the processor 202 to the outside. The communication module 205 is configured to perform communication between the neckband headphone and the outside. The display unit 204 may be a display panel, a laser scanning displayer or the like. The communication module 205 includes but is not limited to Mobile High-Definition Link (HML), Universal Serial Bus (USB), High Definition Multimedia Interface (HDMI), and wireless connection based on technologies such as Wireless Fidelity (WiFi), Bluetooth, low-power Bluetooth, and IEEE802.11s.

The computer readable storage medium according to the embodiment of the present disclosure stores a computer program that, when being executed by a processor, performs the method for starting up a neckband headphone according to any one of the above embodiments.

The computer readable storage medium according to the present disclosure includes a Random Access Memory (RAM), a memory, a Read-only Memory (ROM), an electrically programmable ROM, an electrically erasable programmable ROM, a register, a hard disk, a removable disk, a CD-ROM, or any other storage medium known in the art.

For the description of the method for starting up a neckband headphone, the system for starting up a neckband headphone, the device for starting up a neckband headphone, and the computer readable storage medium according to the embodiments of the present disclosure, one may refer to the detail description of the neckband headphone according to the embodiments of the present disclosure, and therefore the method, the system and the device are not described in detail herein. In addition, parts of the above technical solutions according to the embodiment of the present disclosure that are similar to the technical solutions in the conventional technology are not described in detail herein, so as to avoid excessive repetition.

It should further be noted that in the present disclosure, relationship terms such as "first" and "second" are merely for distinguishing one entity or operation from another entity or operation rather than indicating or implying an actual relationship or order between these entities or operations. In addition, in this specification, terms of "include", "comprise" or any other variants are intended to be non-exclusive. Therefore, a process, method, article or device including multiple elements includes not only the elements but also other elements that are not enumerated, or also include elements inherent in the process, method, article or device. Unless expressively limited otherwise, the statement "comprising (including) one . . . " does not exclude a case that other similar elements may exist in the process, method, article or device.

With the description of the embodiments disclosed above, those skilled in the art may implement or use technical solutions of the present disclosure. Numerous modifications to the embodiments are apparent to those skilled in the art, and the general principles defined herein may be implemented in other embodiments without departing from the spirit or scope of the present disclosure. Therefore, the present disclosure is not limited to the embodiments described herein, but should comply with the widest scope consistent with the principles and novel features disclosed herein.

The invention claimed is:

1. A neckband headphone, comprising:
a neckband;
a first earbud connected to an end of the neckband;
a second earbud connected to another end of the neckband;
a detector; and
a processor connected to the detector, wherein
the detector is configured to acquire state information of the neckband headphone; and
the processor is configured to: determine whether the neckband headphone is worn based on the state information; control the neckband headphone to wake up when determining that the neckband headphone is worn, and control the neckband headphone to be in a low-power mode when determining that the neckband headphone is not worn;
the detector comprises a first wearing detection sensor configured to detect whether the first earbud is separated from the second earbud, and wherein
the first wearing detection sensor comprises a first magnet arranged on the first earbud, a second magnet arranged on the second earbud, and a Hall element arranged on the first earbud or the second earbud;
the detector further comprises a second wearing detection sensor configured to detect whether the neckband headphone is hung on a human neck, and wherein
the second wearing detection sensor comprises an infrared sensor arranged on the neckband headphone.

2. The neckband headphone according to claim 1, wherein
the neckband of the neckband headphone is provided with a sensor protective glass on a side facing the human neck; and
the infrared sensor is arranged between the neckband and the sensor protective glass.

3. The neckband headphone according to claim 1, wherein the state information comprises:
a first distance between the first earbud and the second earbud, wherein the first distance is detected by the first wearing detection sensor; and
a second distance between the neckband and the human neck, wherein the second distance is detected by the second wearing detection sensor.

4. The neckband headphone according to claim 3, wherein the processor is configured to:
determine whether the first distance is less than a first distance threshold stored in the processor;
determine that the first earbud is stuck to the second earbud when determining that the first distance is less than the first distance threshold; and
determine that the first earbud is separated from the second earbud when determining that the first distance is not less than the first distance threshold.

5. The neckband headphone according to claim 3, wherein the processor is configured to:
determine whether the second distance is less than a second distance threshold stored in the processor;
determine that the neckband is hung on the human neck when determining that the second distance is less than the second distance threshold; and
determine that the neckband is not hung on the human neck when determining that the second distance is not less than the second distance threshold.

6. The neckband headphone according to claim 3, wherein for determining whether the neckband headphone is worn based on the state information, the processor is configured to:
determine whether the first distance is less than a first distance threshold stored in the processor;
determine that the neckband headphone is not worn when determining that the first distance is less than the first distance threshold;
determine whether the second distance is less than a second distance threshold stored in the processor when determining that the first distance is not less than the first distance threshold;
determine that the neckband headphone is worn when determining that the second distance is less than the second distance threshold; and
determine that the neckband headphone is not worn when determining that the second distance is not less than the second distance threshold.

7. The neckband headphone according to claim 3, wherein for determining whether the neckband headphone is worn based on the state, the processor is configured to:
determine whether the second distance is less than a second distance threshold stored in the processor;
determine that the neckband headphone is not worn when determining that the second distance is not less than the second distance threshold;
determine whether the first distance is less than a first distance threshold stored in the processor when determining that the second distance is less than the second distance threshold;
determine that the neckband headphone is not worn when determining that the first distance is less than the first distance threshold; and
determine that the neckband headphone is worn when determining that the first distance is not less than the first distance threshold.

8. The neckband headphone according to claim 1, wherein in the low-power mode, only the detector and the processor of the neckband headphone are enabled.

* * * * *